Figure 1:
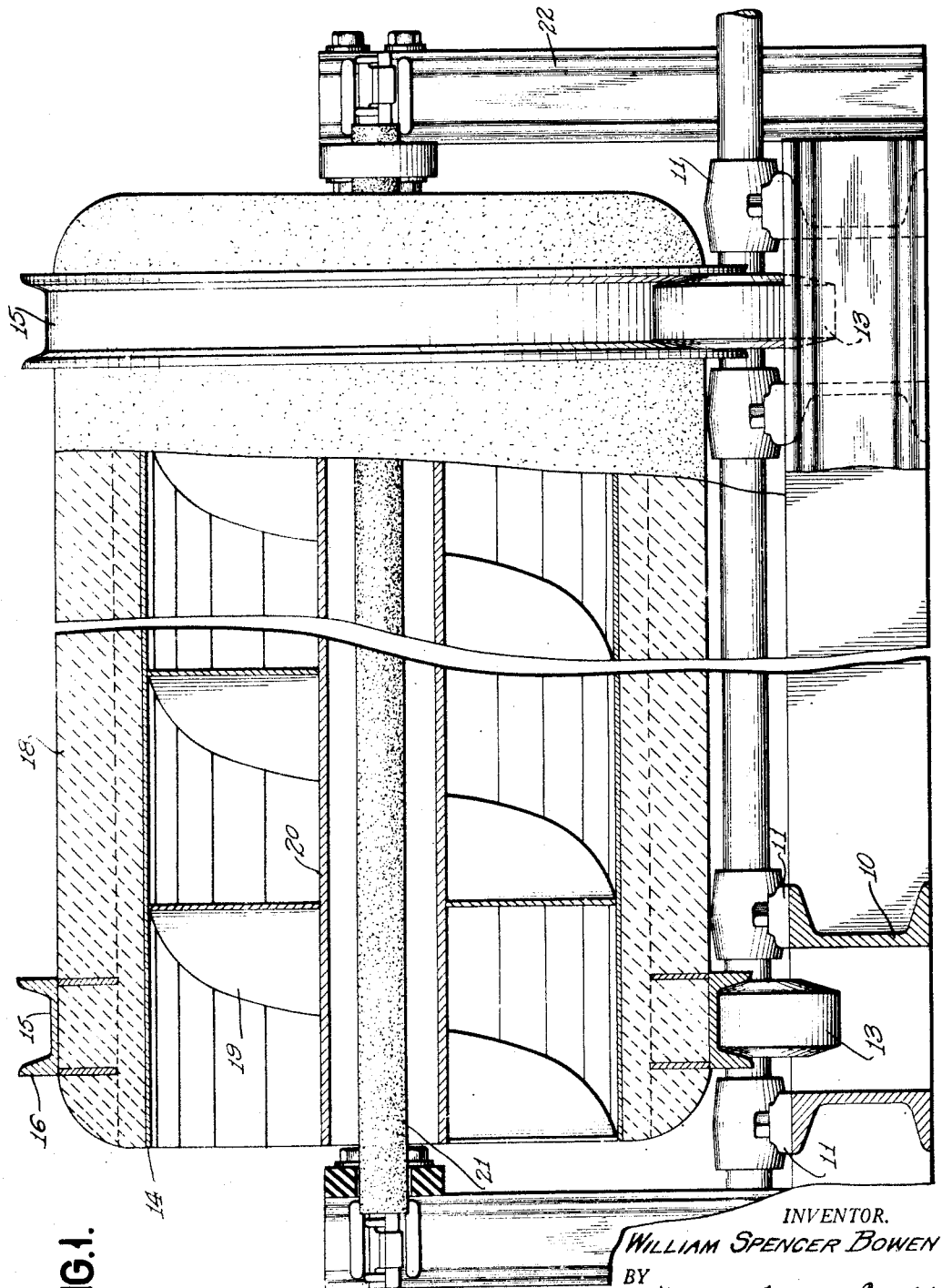

July 18, 1944.  W. S. BOWEN  2,354,100
RADIANT HEATER
Filed Oct. 7, 1942  2 Sheets-Sheet 1

INVENTOR.
WILLIAM SPENCER BOWEN
BY Hoguet, Neary & Campbell
ATTORNEYS.

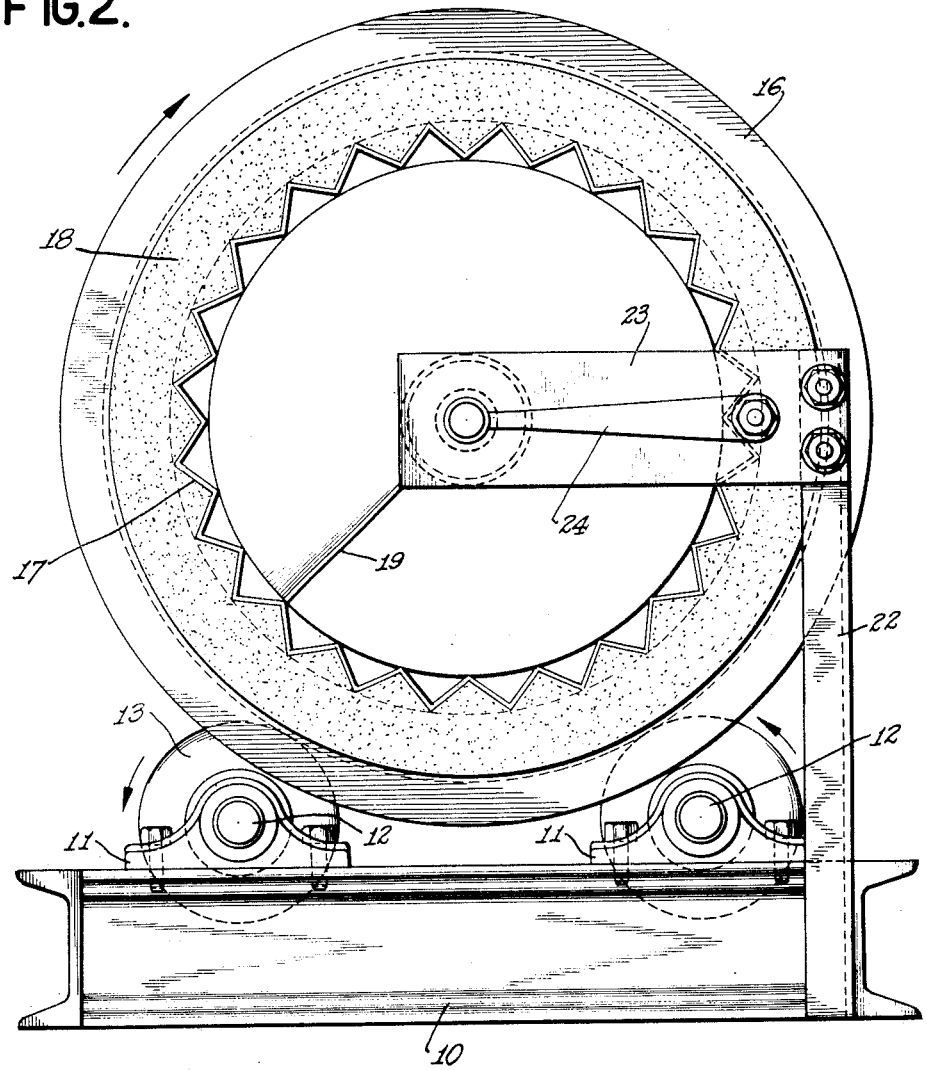

Patented July 18, 1944

2,354,100

UNITED STATES PATENT OFFICE 2,354,100

RADIANT HEATER

William Spencer Bowen, Westfield, N. J.

Application October 7, 1942, Serial No. 461,215

1 Claim. (Cl. 34—142)

The present invention relates to heating devices and embodies, more particularly, an improved radiant heater by means of which roasting of certain products may be effectively accomplished.

An object of the invention is to provide a radiant heating mechanism by means of which adequate heat may be furnished to products such as nuts and the like in an operation that can be carried on continuously and efficiently.

The foregoing object is attained by providing a receptacle in the form of a rotatable cylinder through which the products are advanced progressively while being subjected to the proper application of heat to accomplish the desired roasting operation. The structure is such that the heat necessary for accomplishing the roasting operation is conserved efficiently without destroying the effectiveness of the apparatus or the increased capacity of which it is capable of operating over the capacity of devices heretofore available.

The above and other objects of the invention will be apparent as it is described in greater detail in connection with the accompanying drawings, wherein Fig. 1 is a view in side elevation, partly broken away and in section showing one form of mechanism in which the present invention has been embodied; and Fig. 2 is a view in end elevation showing the device in Fig. 1.

Referring to the above drawings, the device will be seen to include a base or foundation 10 upon which trunnions 11 are provided, shafts 12 being journalled in the trunnions and extending lengthwise of the foundation.

Upon each of the shafts 12 rollers 13 are provided, either or both of the shafts 12 being driven through suitable drive mechanism.

The rollers 13 are adapted to support and drive a cylindrical drum 14 upon the outer periphery of which tires 15 are provided, the tires being formed with spaced flanges 16 between which the rollers 13 are received.

Within the drum 14 a corrugated lining 17 is provided, and a refractory lining 18 is provided in order to reduce the heat losses from the cylinder.

Within the corrugations one or more flights of a screw or vane 19 is provided, the vane 19 being supported upon the corrugations and being formed to receive and support a tube 20 which extends axially through the drum. It will thus be seen that when products are introduced into the drum at one end and the drum rotated in the proper direction, the corrugations and vanes will direct the products through the drum. While the products are thus being directed, they are subjected to heat from a central source consisting of a heating element 21 that is supported upon end supports 22 formed with horizontal arms 23 and having suitable electrical conducting elements 24 to supply an electric current to the heating element 21. In operation, the heating element 21 heats the tube 20 to incandescence and, inasmuch as the vanes 19 in effect sub-divide the interior of the drum into compartments, the heat will be retained within the drum for effective application to the products.

While the invention has been described with specific reference to the structure shown in the accompanying drawings, it is not to be limited thereto save as defined in the appended claim.

I claim:

A heating mechanism comprising a cylindrical drum having an inner lining provided with longitudinally extending corrugations and a refractory outer covering, rollers for supporting said drum for rotation, driving means for rotating at least one of said rollers, a helical vane within said drum having its outer edges secured to the peaks of the corrugations, a tube secured to the vane and extending axially of said drum, an electric heating element within the tube for heating by radiation, and means for supporting said heating element in spaced relation to said tube.

WILLIAM SPENCER BOWEN.